United States Patent
White et al.

(10) Patent No.: US 7,652,562 B2
(45) Date of Patent: Jan. 26, 2010

(54) VEHICLE TEMPERATURE WARNING SYSTEM AND METHOD

(75) Inventors: Jay D. White, Massillon, OH (US); Richard R. Steiner, N. Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 876 days.

(21) Appl. No.: 11/249,191

(22) Filed: Oct. 13, 2005
(Under 37 CFR 1.47)

(65) Prior Publication Data
US 2008/0084289 A1    Apr. 10, 2008

(51) Int. Cl.
*B60Q 1/00* (2006.01)
*G08B 19/02* (2006.01)

(52) U.S. Cl. .................. 340/449; 340/438; 340/439; 340/581

(58) Field of Classification Search .......... None
See application file for complete search history.

(56) References Cited

U.S. PATENT DOCUMENTS

| | | |
|---|---|---|
| 3,614,731 A | 10/1971 | Hluchan et al. |
| 3,691,523 A | 9/1972 | Helms et al. |
| 3,792,434 A | 2/1974 | Williams |
| 4,275,376 A | 6/1981 | Alexander et al. |
| 4,891,973 A | 1/1990 | Bollweber et al. |
| 4,907,452 A | 3/1990 | Yopp |
| 4,943,798 A | 7/1990 | Wayne |
| 4,964,679 A | 10/1990 | Rath |
| 5,061,917 A | 10/1991 | Higgs et al. |
| 5,269,186 A | 12/1993 | Yopp |
| 5,381,090 A | 1/1995 | Adler et al. |
| 5,436,612 A | 7/1995 | Aduddell |
| 5,596,513 A | 1/1997 | Schricker |
| 5,656,993 A | 8/1997 | Coulthard |
| 5,825,286 A | 10/1998 | Coulthard |
| 5,959,365 A | 9/1999 | Mantini et al. |
| 6,161,962 A | 12/2000 | French et al. |

FOREIGN PATENT DOCUMENTS

| | | | |
|---|---|---|---|
| CA | 2200647 A | * | 9/1998 |
| DE | 4024771 A1 | | 2/1992 |

(Continued)

*Primary Examiner*—Julie Lieu
(74) *Attorney, Agent, or Firm*—Krugliak, Wilkins, Griffiths & Dougherty Co., L.P.A.; David P. Dureska; Edward T. Kennedy

(57) ABSTRACT

A temperature warning system for a heavy-duty vehicle, having at least one axle formed with an inner diameter. The axle includes a pair of spindle ends, and a wheel end assembly rotatably mounted on each spindle end. A thermal switch is disposed in the inner diameter of at least one of the axle spindle ends. The switch is electrically connected to a control module to form a closed electrical circuit, and the control module is electrically connected to an indicator device. When the temperature of the switch reaches a predetermined minimum temperature, such as from undesirable increased temperature in the axle spindle end and/or the wheel end assembly, the switch opens, breaking the closed electrical circuit, and causing the control module to activate the indicator device. The indicator device is viewable by the vehicle operator during its operation, thus warning the operator of the undesirable high temperature condition.

16 Claims, 4 Drawing Sheets

FOREIGN PATENT DOCUMENTS

| | | |
|---|---|---|
| DE | 4431045 A1 | 3/1996 |
| GB | 2070776 A | 9/1981 |
| JP | 11125244 A * | 5/1999 |
| WO | WO 02/18878 A2 | 3/2002 |
| WO | WO 2004/027433 A1 | 4/2004 |

* cited by examiner

VEHICLE TEMPERATURE WARNING SYSTEM AND METHOD

BACKGROUND OF THE INVENTION

1. Field of the Invention

The invention relates to the art of temperature warning systems for vehicles, and in particular to temperature warning systems for heavy-duty vehicles, such as tractor-trailers or semi-trailers, and straight trucks, which can function during vehicle operation. More particularly, the invention relates to high-temperature warning systems that are mountable in an axle spindle end of such heavy-duty vehicles for indicating an undesirable high temperature in the axle spindle end and/or associated wheel components during vehicle operation.

2. Background Art

Reference herein is made to tractor-trailers by way of example, with the understanding that such reference applies to other heavy-duty vehicles, such as straight trucks. All tractor-trailers include at least one trailer, and sometimes two or three trailers, all of which are pulled by a single tractor. Each trailer includes a frame, from which at least one axle is suspended. A wheel end assembly is rotatably mounted on each end of the axle. More specifically, each wheel end assembly includes bearing assemblies that are mounted on a respective axle spindle end, and a wheel hub which in turn is mounted on the bearing assemblies. In this manner, the bearing assemblies enable the wheel hub to rotate about the axle spindle end.

To facilitate smooth rotation of each wheel hub about its respective axle spindle end, the bearing assemblies typically include a lubricant. A bearing seal formed of a relatively flexible material, such as rubber, is disposed on the inboard end of the wheel hub to isolate the bearing assemblies for preventing contaminants from passing into the bearings, and to contain the lubricant within the bearings. Repeated excessive speed or excessive braking of the vehicle often generates a large amount of heat in components of the wheel end assembly and/or the axle spindle end, in turn heating the bearing lubricant and/or the bearing seal, which may cause degradation of the lubricant or the bearing seal. If the lubricant degrades, rotation of the wheel hub about the axle spindle end may become impaired and can result in damage to or failure of the wheel end assembly and/or the axle spindle end.

Alternatively, if the seal degrades, the lubricant may escape, or external contaminants may pass into the bearing assemblies, which can also impair the rotation of the wheel hub about the axle spindle end and may potentially damage the wheel end assembly or the axle spindle end. Similar potential damage may be caused by installation problems which detrimentally affect the lubricant and/or bearing assemblies, and thus allow excessive heat to be generated in the wheel end components or the axle spindle end. Such installation problems include situations in which the lubricant accidentally may have been omitted from the bearing assemblies, and/or over-tightening of the bearing retaining nuts, which can overload the bearing assemblies.

In addition, in some applications, sealed bearing assemblies are used. Sealed bearing assemblies are self-contained units that are packed with lubricant and include a seal that is built into the bearing assembly. Such sealed bearing assemblies are known in the art as being non-serviceable, and thus typically cannot readily be opened up in order to replace or add lubricant if the lubricant escapes the assembly or degrades. Rather, sealed bearing assemblies are typically removed from service and replaced if such a problem occurs. Since it is desirable to remove a sealed bearing from service in the event that such a problem does occur, it is advantageous to attempt to monitor conditions that may indicate a potential problem, such as the generation of excessive heat, as described above.

Because multiple trailers, each possibly having multiple axles and multiple wheel ends, may be pulled by a single tractor, the chance that a given wheel end assembly and/or axle spindle end may become impaired from the above-described conditions without detection by the vehicle operator increases. Since the potential damage resulting from an undetected high temperature is undesirable, it is advantageous to attempt to monitor the components of the axle, including the spindle ends, and/or the wheel end assemblies for high-temperature conditions. Such conditions may indicate degradation of or a lack of the proper amount of lubricant in the bearing assemblies, degradation of the bearing seals, contamination in the bearing assemblies, an overloading of the bearings, or the breaking down of the bearing itself. It is also advantageous to alert the operator of the vehicle when a high-temperature condition is detected, which enables the operator to remove the vehicle from service to reduce the potential damage that may result from such high-temperature conditions.

In the prior art, attempts to monitor conditions at the wheel end assembly and/or in the axle spindle end have been made. However, early attempts resulted in systems that are inconvenient to check or that can only be checked when the vehicle is not moving, such as the use of a mechanical indicator on the wheel hub. In an attempt to improve such systems, more sophisticated approaches have been developed. These more sophisticated systems use circuits that employ resistance elements such as a resistor or a thermistor, which create an open electrical circuit at normal operating temperature. When the temperature increases, the resistance element closes the electrical circuit, which generates an alarm. Such open-circuit systems, however, cannot be easily diagnosed for broken wires or other potential problems at normal operating temperatures, since electrical current cannot pass through the open circuit. In addition, a resistance element typically closes a circuit gradually, which may create a delay in the alarm, or may create uncertainty as to the exact temperature at which the alarm is triggered.

Other prior art approaches to such temperature measurement are relatively elaborate, and typically utilize a programmable microprocessor to control the system. The microprocessor interprets incoming data from a sensor and executes a pre-programmed decision-making process to determine when an alarm should be activated. These microprocessors, however, undesirably add to the complexity and expense of a temperature warning system. Moreover, some of these prior art systems also utilize transmitters and batteries, which have limited life spans, necessitating frequent diagnosis and repair.

As a result, the temperature warning systems of the prior art include significant disadvantages, including inconvenience, lack of self-diagnosis, lack of rapid and accurate alarm generation, and high cost due to system complexities. Therefore, a longstanding need has existed in the art for a temperature warning system that is easy to use and convenient, which activates quickly and accurately, which is capable of self-diagnosis, and is economical to purchase and maintain. The present invention provides such a temperature warning system.

SUMMARY OF THE INVENTION

One objective of the present invention is to provide such a temperature warning system that activates quickly and easily to accurately inform the vehicle operator of an undesirably high temperature of axle spindle end and/or wheel end components.

Another objective of the present invention is to provide such a temperature warning system that is convenient and easy to use.

Yet another objective of the present invention is to provide such a temperature warning system that is capable of self-diagnosis.

Still another objective of the present invention is to provide such a temperature warning system that is economical to purchase and maintain. These objectives and advantages are obtained by the temperature warning system of the present invention. A temperature warning system for a heavy-duty vehicle, in which the vehicle includes an axle having a pair of spindle ends, and each axle spindle end is formed with an inner diameter and has a wheel end assembly rotatably mounted on it, includes a thermal switch located in the inner diameter of at least one of the axle spindle ends. A control module is electrically connected to the switch to form a closed electrical circuit with the switch, and an indicator device is electrically connected to the control module. When the temperature of the switch reaches a predetermined minimum temperature, the switch opens, breaking the closed electrical circuit, causing the control module to activate the indicator device.

These objectives and advantages are also obtained by the method of indicating an increased temperature of the present invention. The method provides for indication of an increased temperature in a spindle end of an axle of a heavy-duty vehicle, in which the axle spindle end is formed with an inner diameter, and has a wheel end assembly rotatably mounted on it. A thermal switch is disposed in the axle spindle end inner diameter and is electrically connected to a control module to form a closed electrical circuit. The control module is electrically connected to an indicator device. When the temperature of the switch reaches a predetermined minimum temperature, the closed electrical circuit is opened and the indicator device is activated.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

The present invention vehicle temperature warning system includes components and a method of control of those components that provides more reliable and convenient control than simple systems and methods of the prior art, is less costly than complex systems of the prior art, and has the capability to perform a simple self-diagnosis. It is to be understood that the drawings and the following description are for purposes of illustrating a preferred embodiment of the invention and not for limiting the same.

Figure 1:
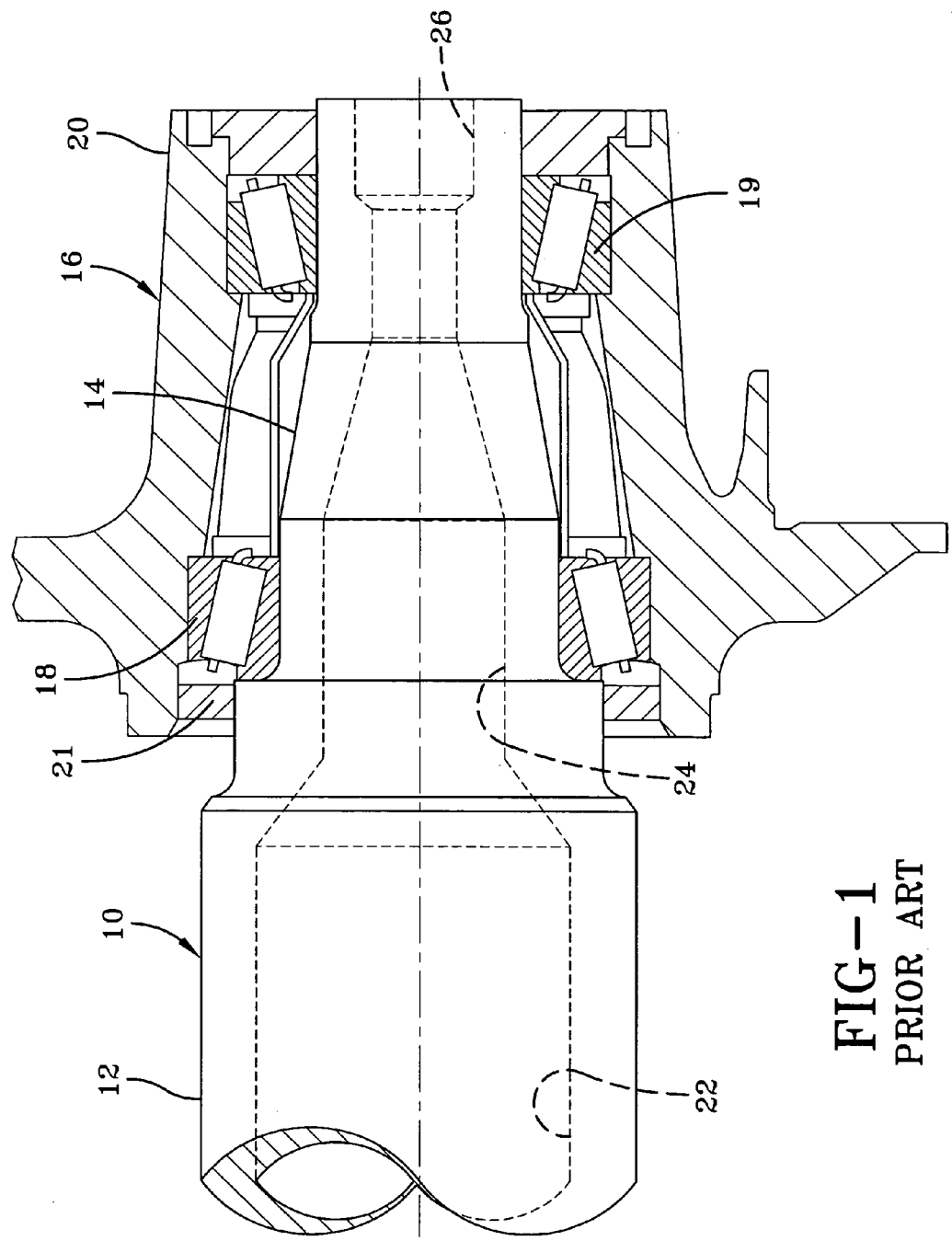
FIG. 1 is a fragmentary plan view of a heavy-duty tractor-trailer axle, including the axle spindle end and its associated wheel end assembly of the prior art, with the wheel end assembly shown in cross-section, and hidden parts represented by dashed lines.

In order to better understand the environment in which the temperature warning system of the present invention is utilized, a portion of a typical axle 10 and a wheel end assembly 16 each is shown in FIG. 1 and now will be described. Axle 10 includes a central tube 12 and a pair of spindle ends 14, each one of which is located on a respective one of a pair of outboard ends of the central tube. Wheel end assembly 16 includes inboard and outboard bearing assemblies 18 and 19, respectively, which are mounted on axle spindle end 14, and a wheel hub 20 that is mounted on the bearing assemblies in a well-known manner, thereby enabling the wheel hub to rotate about the axle spindle end. For the sake of clarity, only one axle spindle end 14 and wheel end assembly 16 will be described herein, though two are present on each axle 10, and a typical tractor-trailer (not shown) includes multiple axles. A bearing seal 21 is mounted on the inboard end of wheel end assembly 16 adjacent inboard bearing assembly 18, for sealing the wheel end assembly and keeping the lubricant (not shown) contained within bearing assemblies 18, 19 intact, and also for preventing contaminants from passing into the bearing assemblies.

It should be noted that a hub cavity 17 exists between inboard bearing assembly 18 and outboard bearing assembly 19, and typically also contains lubricant. Moreover, depending on the application, lubricant may further be contained within a hub cap (not shown) that is mounted on the outboard end of wheel hub 20. For the purpose of convenience, reference herein will be made to the lubricant in bearing assemblies 18, 19 and hub cavity 17 with the understanding that such reference also includes lubricant in the hub cap.

As described above, certain driving conditions or installation problems may be the cause of excessive heat generation in axle spindle end 14 and/or wheel end assembly 16, in turn causing degradation of the lubricant in bearing assemblies 18, 19 and hub cavity 17, or the breaking down of bearing seal 21, allowing the lubricant to leak out of, and/or contaminants to enter, one or both of the bearing assemblies. In addition, other problems may lead to inadequate lubrication of bearing assemblies 18, 19 or undue load on the bearing assemblies, all of which can cause the generation of excessive heat, which in turn may damage axle spindle end 14 and/or wheel end assembly 16 during vehicle operation. The temperature warning system of the present invention detects and indicates the generation of such excessive heat, alerting the driver of the tractor-trailer of a high-temperature situation, thereby reducing or eliminating the possibility of damage caused by continued operation in such an excessive temperature state.

It is important to note that, with continuing reference to FIG. 1, axle 10 is of a hollow type and includes an inner diameter 22 in central tube 12. Axle spindle end 14 also includes an inner diameter that corresponds to inner diameter 22 of central tube 12 and tapers to a smaller variable diameter 24. Alternatively, axle spindle inner diameter 24 may be straight, rather than tapered. A counterbore 26 is formed in the outboard end of axle spindle end 14 about axle spindle inner diameter 24 and extends into the axle spindle end a short distance, such as from about 0.5 inches to about 6 inches. Since counterbore 26 is machined after axle spindle end 14 is formed, the counterbore typically is of a narrower geometric tolerance than the remainder of axle spindle inner diameter 24, which is useful for mounting certain components of the temperature warning system of the present invention, as will be described below.

Figure 2:
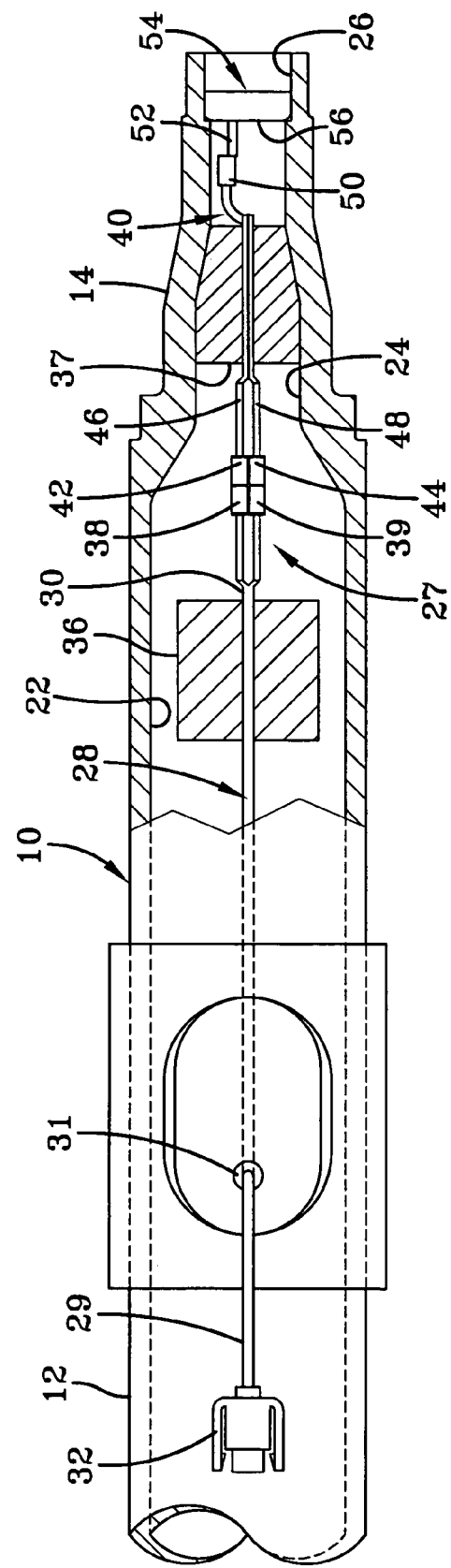
FIG. 2 is a fragmentary plan view, partially in cross-section, of a heavy-duty tractor-trailer axle incorporating the temperature warning system of the present invention in the axle spindle end, with hidden parts represented by dashed lines.

Turning now to FIG. 2, a temperature warning system of the present invention is indicated generally at 27, and shown incorporated into an axle 10 of the type shown in FIG. 1. More specifically, an electrical cable 28 includes inboard and outboard ends 29, 30, respectively, and is disposed in inner diameter 22 of axle central tube 12. Electrical cable 28 exits axle central tube 12 via a watertight strain relief fitting 31 disposed in the wall of the central tube. Cable inboard end 29 terminates at a cable connector 32, which is electrically connected to a wiring harness 35 (shown schematically in FIG. 4) via a wiring harness connector 34, in a manner known to those skilled in the art. Cable outboard end 30 passes through a first air filter 36 disposed in axle tube inner diameter 22 in a manner known to those skilled in the art. First air filter 36 acts a strain relief fitting that supports electrical cable outboard end 30 and prevents the cable from scuffing against the inner wall of axle central tube 12. Cable outboard end 30 is attached to, in a usual manner, and terminates at, a pair of cable plugs 38 and 39, which in turn electrically connect cable 28 to a temperature sensor assembly 40.

With continuing reference to FIG. 2, cable plugs 38, 39 of cable outboard end 30 are electrically connected to first and second sensor plugs 42 and 44, respectively, of temperature sensor assembly 40 in a usual manner, and preferably at the outboard end of inner diameter 22 of axle central tube 12. Alternatively, cable plugs 38, 39 may connect to first and second sensor plugs 42, 44, respectively, preferably at the inboard end of inner diameter 24 of axle spindle end 14. Cable plugs 38, 39 and first and second sensor plugs 42, 44 preferably are bullet connectors, as known in the art.

Figure 3:
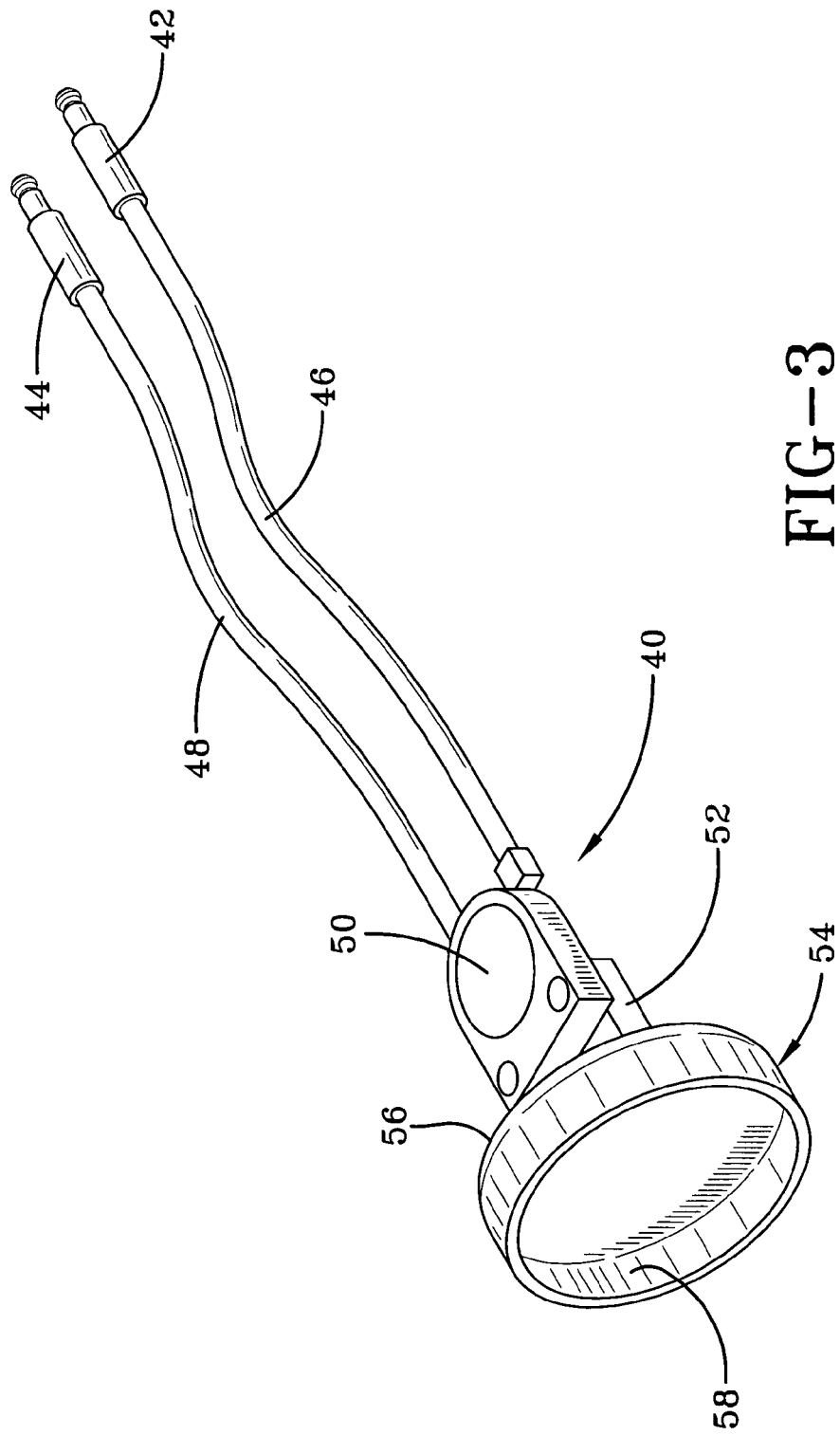
FIG. 3 is a perspective view of a temperature sensor assembly of the temperature warning system shown in FIG. 2.

With continuing reference to FIG. 2 and additional reference to FIG. 3, temperature sensor assembly 40 also includes a first sensor wire 46 that is attached to and extends outboardly from first sensor plug 42, and a second sensor wire 48 that similarly is attached to and extends outboardly from second sensor plug 44. First and second sensor wires 46, 48 pass through a second air filter 37 that is disposed in axle spindle end inner diameter 24 in a manner known to those skilled in the art. Second air filter 37 acts a strain relief fitting that supports first and second sensor wires 46, 48 and prevents the wires from scuffing against the inner wall of axle spindle end 14. Second air filter is more fully described in U.S. Pat. No. 6,024,417, which issued on Feb. 15, 2000, and is assigned to the assignee of the present invention. First and second sensor wires 46, 48 are electrically connected at their respective outboard ends to a sensor switch 50 outboardly of second air filter 37. Sensor switch 50 is fastened to an inboard surface 56 of a spindle plug 54 via a mounting bracket 52. Spindle plug 54 includes a lip 58 that engages the wall of machined counterbore 26 in axle spindle end 14 in a secure press-fit. In this manner, temperature sensor assembly 40 is removably secured in inner diameter 24 of axle spindle end 14.

Figure 4:
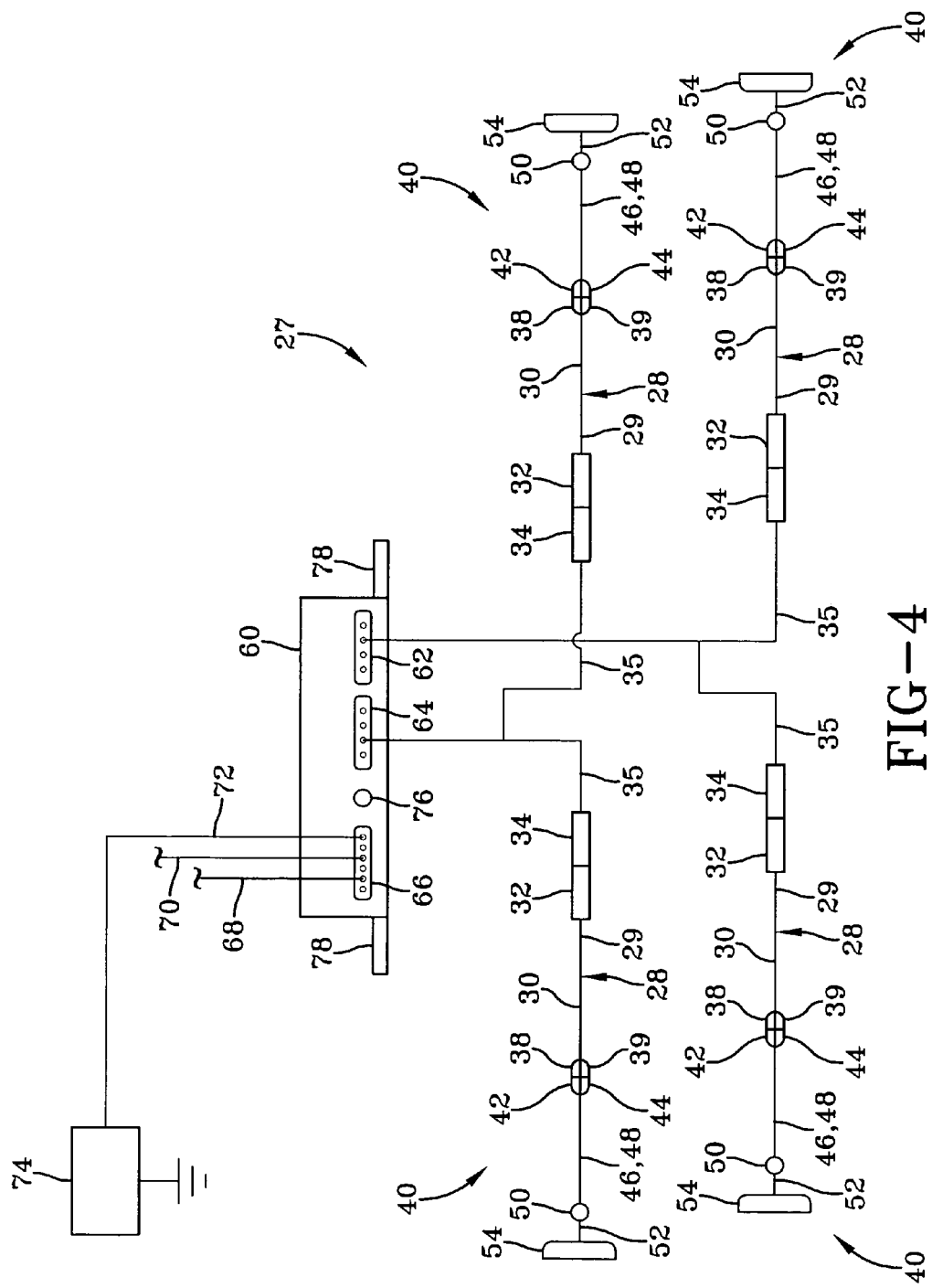
FIG. 4 is a schematic diagram representing the general layout and connections of the temperature warning system of the present invention.

Turning now to FIG. 4, temperature warning system 27 is schematically shown and preferably includes a plurality of sensor switches 50, with each switch being secured in counterbore 26 (FIG. 2) of a respective one of the plurality of axle spindle ends 14 typically found on a heavy-duty vehicle such as a semi-trailer (not shown). As described above, each sensor switch 50 is fastened to a respective spindle plug 54 via a mounting bracket 52. First and second sensor wires 46, 48 extend inboardly from sensor switch 50 and are electrically connected to first and second sensor plugs 42 and 44, respectively, which in turn are respectively connected to plugs 38 and 39 of outboard end 30 of axle electrical cable 28 within inner diameter 22 of axle central tube 12. As described above, inboard end 29 of axle electrical cable 28 exits axle central tube 12, and terminates at cable connector 32, which is electrically connected to wiring harness 35 via wiring harness connector 34. Cable connector 32 is shown in FIG. 2 as a male-type connector, with the understanding that wiring harness connector 34 is a female-type connector. Of course, cable connector 32 could be of the female type and wiring harness connector 34 could be of the male type, as is well-known in the art, without affecting the overall concept of the present invention.

Each wiring harness 35 is electrically connected to a control module 60 via first and second connectors 62 and 64. The connection of wiring harnesses 35 to control module 60 is made to allow all sensor switches 50 to be wired in series, thereby forming a closed electrical circuit, as is well known to those skilled in the art. Control module 60, in turn, is electrically connected to an indicator device 74, such as a warning light, which preferably is mounted on the trailer (not shown) at a location that is viewable by the vehicle operator during vehicle operation. The connection from the closed electrical circuit of sensor switches 50 to warning light 74 is via a relay (not shown) in control module 60. That is, temperature sensor assemblies 40 and trailer warning light 74 are wired in parallel relative to one another, so that the temperature sensing feature of system 27 functions independently of the activation of the trailer warning light.

More specifically, preferably, a first wire 72 is electrically connected to and extends from a third connector 66 on module 60 and is electrically connected to warning light 74. A second wire 68 is electrically connected to and extends from third connector 66 and is electrically connected to a power source (not shown). A third wire 70 also is electrically connected to and extends from third connector 66 and connects to ground. The connection of second wire 68 to a power source provides power to temperature warning system 27, so that when the power to the trailer is on, the warning system is on. Control module 60 also includes a light emitting diode (LED) 76 to enable a technician to verify whether there is power to the control module. Control module 60 further includes mounting ears 78 to allow mechanical connection to the frame of the trailer at a convenient location.

It is important to note that control module 60 includes a microcontroller (not shown), rather than a programmable microprocessor, which enables the control module to be relatively inexpensive, yet still accomplish the objectives of the present invention. More particularly, certain prior art systems include programmable microprocessors that are relatively expensive, due to their ability to be programmed with and execute sophisticated instructions and sequences, such as complex algorithms. In contrast, the microcontroller of control module 60 only is able to respond to simple instructions, and thus is much more economical than a programmable microprocessor.

It is also important to note that the microcontroller of control module 60 controls a power-up check of warning light 74, as described below, rather than communication of the control module with temperature sensor assemblies 40, in contrast to certain prior art systems. That is, systems of the prior art that use a programmable microprocessor typically use the microprocessor to control communication with the temperature sensing apparatus, such as to decide if the temperature being sensed is actually an alarm condition. In contrast, the microcontroller of control module 60 is not involved in decisions regarding temperature sensing, since opening of any one of switches 50 automatically triggers an alarm condition.

Thus, temperature warning system 27 essentially is a single closed circuit that is wired in series to connect all temperature sensor assemblies 40. When one switch 50 opens, the circuit is broken, causing the relay in control module 60 to close, thereby activating trailer warning light 74. More specifically, when electrical current passes through switches 50, the contacts of the relay in control module 60 are held open. When the electrical current stops, such as when a switch 50 opens, the contacts of the relay in control module 60 close, activating warning light 74. Therefore, it can be seen the temperature warning system 27 of the present invention instantly warns a driver of a high-temperature condition in axle spindle end 14 and/or wheel end assembly 16 while the vehicle is moving; there is no need for the driver to stop the vehicle to check a mechanical indicator on the hub, as in simple systems of the prior art.

In addition, the closed circuit of temperature warning system 27 creates a continuously self-diagnosing system. The connection provided by second wire 68 to the power source allows warning system 27 to be activated when the vehicle is on. If warning system 27 is functioning properly, the electrical circuit is complete and warning light 74 is not illuminated. If there is any failure, however, such as a broken wire, the circuit is broken, activating warning light 74. This configuration also eliminates concerns regarding transmitter or battery life experienced in some prior art systems. Moreover, the use of sensor switch 50 to break the closed circuit once it reaches a predetermined temperature, as will be described in greater detail below, rather than a gradually-closing resistance element as used in some prior art systems, enables instantaneous activation of warning system 27.

On powering up, the microcontroller of control module 60 is used to perform a check to ensure that warning light 74 is functioning. That is, the microcontroller of control module 60 causes warning light 74 to temporarily illuminate, such as for a period of about two seconds. If warning light 74 does not temporarily illuminate, then it is likely that one of the following conditions is present: there is no power or not enough power to warning system 27; the warning light needs to be replaced; or, there is a wiring problem between control module 60 and the warning light.

As a further example of the self-diagnosing nature of temperature warning system 27, the system is able to assess each of these conditions. For example, if warning light 74 does not temporarily illuminate on powering up, LED 76 is checked. If LED 76 is not illuminated, warning system 27 does not have enough power. Conversely, if LED 76 is illuminated, warning system 27 has enough power. Therefore, if LED 76 is illuminated, and the wiring of warning system 27 is intact, the bulb of warning light 74 needs to be replaced. If LED 76 is illuminated and the bulb of warning light 74 is functional, then the problem likely is to be the wiring between control module 60 and the warning light.

If warning light 74 remains illuminated once the power-up check of the light is complete, either one or more sensor switches 50 are open or there is a broken wire in system 27. If warning light 74 turns off after the power-up check, warning system 27 enters normal operation and the light remains off. After this point, if warning light 74 illuminates, one or more sensor switches 50 are open or there is a broken wire. That is, as described above, warning light 74 and temperature sensor assemblies 40 are wired in parallel relative to one another, and the warning light 74 is connected to the microcontroller of control module 60. This structure causes warning light 74 to illuminate when only one switch 50 is open, or when there is a broken wire that opens the closed circuit. Of course, warning light 74 illuminates if multiple switches 50 are open and/or if multiple wires of system 27 are broken. In any event, temperature warning system 27 does not identify which sensor switch 50 has opened or which wire is broken. As a result, a mechanic determines which axle spindle end 14 and/or wheel end 16 is warm, causing a corresponding sensor switch 50 to open, and/or if there is a break in the wiring of system 27.

Sensor switch 50 preferably is a bimetallic thermal switch, although other types of switches as known in the art may be used. A preferred switch 50 has a nominal operating temperature of about 225 degrees Fahrenheit, with a tolerance range that is typical for bimetallic switches, such as from about plus 5 degrees Fahrenheit to about minus 25 degrees Fahrenheit, resulting in a temperature range of from about 200 degrees Fahrenheit to about 230 degrees Fahrenheit in which the switch opens. This temperature range is considered to be optimum because this is the range in which typical nonsynthetic bearing lubricants begin to degrade. Of course, the type of switch 50 and the corresponding temperature at which it opens may vary, and depends upon the specific application. For example, if temperature warning system 27 is used in an application in which synthetic bearing lubricants are employed, switch 50 alternatively may be designed to open at temperatures higher than a range of from about 200 to 230 degrees Fahrenheit. Thus, switch 50 is designed to open at a predetermined minimum temperature, which is above the normal operating temperature of the specific bearing lubricant that is to be used, and is in the temperature range at which that lubricant is expected to begin to degrade.

It is important to note that, because the minimum temperature at which switch 50 opens may be relatively low in view of some operating conditions, temperature increases caused by relatively temporary conditions, such as excess speed or braking on a long grade, could increase the temperature sensed by the sensor enough to open the closed circuit of temperature warning system 27, thereby illuminating warning light 74. Once the condition has subsided, however, such as by allowing the brakes to cool down, the temperature will decrease, causing sensor switch 50 to close, again closing the circuit and causing warning light 74 to turn off. Preferably, switch 50 is designed to open at as high a temperature as reasonably possible to indicate an excessive-heat situation, thereby minimizing situations in which warning light 74 is illuminated for such temporarily-demanding operating conditions. For example, switch 50 preferably will not open at a temperature that is less than about 200 degrees Fahrenheit. Of course, repeated conditions such as excessive speed and excessive braking can break down the bearing lubricant, as noted above, which may create a high-temperature situation that is not attributable to a temporarily-demanding operating condition, in which case temperature warning system 27 activates warning light 74 as contemplated by the present invention.

It should also be noted that various conditions that may cause the lubricant in bearings 18, 19 and/or hub cavity 17 to degrade will cause sensor switch 50 to open, such as: an extremely high outside temperature; an extremely high braking temperature; an excessive preload of the bearings; a loss of lubrication in the bearings; friction increasing in the bearings because of rapid degradation of lubricant; and breaking down of the bearing itself. In these circumstances, the temperature at axle spindle end 14 will increase and cause sensor switch 50 to open, thereby alerting the vehicle operator that an undesirable condition exists.

In this manner, temperature warning system 27 of the present invention provides a more efficient and dependable system than is found in the prior art, leading to distinct economic and safety advantages. Temperature warning system 27 thus provides an apparatus and method for more reliable and convenient monitoring of the temperature of axle spindle end 14 and wheel assembly 16 than the simple systems of the prior art, and a system that is less expensive to purchase and maintain than the complex microprocessor-based systems of the prior art. In addition, temperature warning system 27 uses switches 50 rather than resistance elements, thereby activating more quickly and easily than some prior art systems. Moreover, the use of an electrical circuit that is closed at normal operating conditions creates a self-diagnosing system 27, thereby overcoming disadvantages of prior art systems.

Accordingly, the vehicle temperature warning system and method of the present invention are simplified, provide an effective, safe, inexpensive and efficient system and method which achieve all the enumerated objectives, provide for eliminating difficulties encountered with prior vehicle temperature warning systems and methods, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the vehicle temperature warning system and method are installed and used, the characteristics of the construction, arrangement and method steps, and the advantageous, new and useful results obtained; the new and useful structures, devices, elements, arrangements, processes, parts and combinations are set forth in the appended claims.

What is claimed is:

1. A temperature warning system for a heavy-duty vehicle including at least one axle having a pair of spindle ends, each spindle end being formed with an inner diameter, and having a wheel end assembly rotatably mounted thereon, said temperature warning system comprising:
    a thermal switch disposed in said inner diameter of at least one of said axle spindle ends;
    a control module electrically connected to said switch to form a closed electrical circuit with the switch, said control module including a relay electrically connected to said closed electrical circuit; and
    an indicator device electrically connected to said relay in said control module, whereby when the temperature of said switch reaches a predetermined minimum temperature, the switch opens to break said closed electrical circuit and activates the indicator device, said relay further enabling self-diagnosis of said temperature warning system.

2. The temperature warning system of claim 1, wherein said thermal switch and said indicator device are wired in parallel relative to one another.

3. The temperature warning system of claim 1, further comprising a plurality of said thermal switches wired in series, whereupon the failure of any one switch breaks said closed electrical circuit.

4. The temperature warning system of claim 1, wherein said electrical connection from said switch to said control module is made by a wire, and the control module activates said indicator device when said wire is broken.

5. The temperature warning system of claim 1, wherein said predetermined minimum temperature is above about 200 degrees Fahrenheit.

6. The temperature warning system of claim 1, wherein said thermal switch is secured in said inner diameter of said axle spindle end by a press-fit plug.

7. The temperature warning system of claim 1, wherein said thermal switch is a bimetallic switch.

8. The temperature warning system of claim 1, wherein said indicator device is a light.

9. The temperature warning system of claim 8, wherein said control module performs a check of said light.

10. The temperature warning system of claim 1, wherein said control module includes a light emitting diode and said light emitting diode is illuminated when said temperature warning system is receiving power.

11. A method of indicating an increased temperature in a spindle end of an axle of a heavy-duty vehicle, said axle spindle end being formed with an inner diameter, and having a wheel end assembly rotatably mounted thereon, said method comprising the steps of:
    disposing a thermal switch in said axle spindle end inner diameter;
    electrically connecting said switch to a control module to form a closed electrical circuit;
    electrically connecting said control module to said closed electrical circuit;
    electrically connecting said relay in said control module to an indicator device;
    opening said closed electrical circuit when the temperature of said switch reaches a predetermined minimum temperature;
    activating said indicator device when said closed electrical circuit is opened; and
    enabling self-diagnosis of said temperature warning system using said relay.

12. The method of indicating an increased temperature in an axle spindle end of claim 11, wherein said thermal switch and said indicator device are wired in parallel relative to one another.

13. The method of warning of an increased temperature in an axle spindle end of claim 11, wherein said predetermined minimum temperature is above about 200 degrees Fahrenheit.

14. The method of indicating an increased temperature in an axle spindle end of claim 11, wherein the step of selectively performing self-diagnosis of said temperature warning system includes performing a check of said indicator device with said control module.

15. The method of indicating an increased temperature in an axle spindle end of claim 11, further comprising the step of illuminating a light emitting diode on said control module when said temperature warning system is receiving power.

16. The method of indicating an increased temperature in an axle spindle end of claim 11, further comprising the step of securing said thermal switch in said inner diameter of said axle spindle end with a press-fit plug.

* * * * *

UNITED STATES PATENT AND TRADEMARK OFFICE
CERTIFICATE OF CORRECTION

PATENT NO. : 7,652,562 B2  Page 1 of 1
APPLICATION NO. : 11/249191
DATED : January 26, 2010
INVENTOR(S) : Jay D. White and Richard R. Steiner It is certified that error appears in the above-identified patent and that said Letters Patent is hereby corrected as shown below:

Please amend Claim 11, Column 10, line 30, after the word "connecting" insert the words --a relay in--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,652,562 B2  
APPLICATION NO. : 11/249191  
DATED : January 26, 2010  
INVENTOR(S) : White et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Twenty-third Day of November, 2010

David J. Kappos  
*Director of the United States Patent and Trademark Office*